United States Patent
Ramle et al.

(10) Patent No.: US 9,351,234 B2
(45) Date of Patent: May 24, 2016

(54) ENHANCED APN RESOLUTION

(75) Inventors: Peter Ramle, Mölnlycke (SE); Wang Min Lennartsson, Göteborg (SE); Lasse Olsson, Stenungsund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1212 days.

(21) Appl. No.: 12/997,360

(22) PCT Filed: May 11, 2009

(86) PCT No.: PCT/EP2009/055665
§ 371 (c)(1),
(2), (4) Date: Dec. 10, 2010

(87) PCT Pub. No.: WO2009/150003
PCT Pub. Date: Dec. 17, 2009

(65) Prior Publication Data
US 2011/0090852 A1 Apr. 21, 2011

Related U.S. Application Data

(60) Provisional application No. 61/060,537, filed on Jun. 11, 2008.

(51) Int. Cl.
H04W 40/00 (2009.01)
H04W 48/00 (2009.01)
H04W 48/20 (2009.01)

(52) U.S. Cl.
CPC .............. *H04W 48/17* (2013.01); *H04W 48/20* (2013.01)

(58) Field of Classification Search
USPC .................. 370/328, 331, 338; 455/435.1
See application file for complete search history.

(56) References Cited

U.S. PATENT DOCUMENTS

| | | | |
|---|---|---|---|
| 2003/0112793 A1 | 6/2003 | Sengodan | |
| 2004/0032865 A1 | 2/2004 | Kwon | |
| 2004/0120296 A1* | 6/2004 | Lee | H04W 88/16 370/338 |
| 2006/0221986 A1* | 10/2006 | Berg | H04W 48/17 370/401 |
| 2008/0291872 A1* | 11/2008 | Henriksson | 370/329 |

FOREIGN PATENT DOCUMENTS

| | | |
|---|---|---|
| EP | 1715715 A1 * | 10/2006 |
| KR | 2004 0008812 | 1/2004 |
| WO | WO 2005/122617 | 12/2005 |
| WO | WO 2006/100024 | 9/2006 |

OTHER PUBLICATIONS

International Search Report for PCT/EP2009/055665, mailed Sep. 3, 2009.

International Preliminary Report on Patentability with Two (2) Amended Sheets, Dec. 11, 2009.

(Continued)

*Primary Examiner* — Thai Nguyen

(57) ABSTRACT

The present invention relates to a solution for resource allocation and in particular in relation to resolving a gateway. The solution according to the present invention uses an infix in an access point name, comprising a geographical area, in communicating with a domain name server. The infix is chosen from a list comprising unique combinations of selection criteria.

21 Claims, 4 Drawing Sheets

(56) References Cited

OTHER PUBLICATIONS

"Draft 0.4a Naming, Addressing & Identification Issues for UMTS", 3GPP Draft, vol. SA WG2, No. Sophia, (Oct. 11, 2000), 55 pages.

Ericsson: "Pseudo-CR on PGW node selection based on DNS", 3GPP Draft, vol. CT WG4, No. Jeju Island; (Apr. 6, 2008), 14 pages.
Digital Cellular Telecommunications System (Phase 2+); Universal Mobile Telecommunications System (UMTS), vol. 3-CN2; 3-CN4, No. V7.7.0, (Apr. 1, 2008), 56 pages.

* cited by examiner

ENHANCED APN RESOLUTION

This application is the U.S. national phase of International Application No. PCT/EP2009/055665, filed 11 May 2009, which designated the U.S. and claims the benefit of U.S. Provisional Appln. No. 61/060,537, filed 11 Jun. 2008, the entire contents of each of which are hereby incorporated by reference.

TECHNICAL FIELD

The present invention relates to a solution for resource allocation and in particular in relation to resolving a gateway.

BACKGROUND

Today, the mobile networks are becoming packet switched and the users are broadening their use of the network from a mobile phone usage to a media solution. This sets demands on the availability of the networks and of the quality of connections. Standardization work is set up to optimize the solutions and provide control of network configurations. However, the standardization work can not anticipate all scenarios.

As users demand for more communication bandwidth and quality of connections increases, the network configurations need to follow suit. For instance, when users set up new applications or media streams, the networks need to adapt and provide connections or the user will not be satisfied with the service provided.

Different operators have different service offerings and different solutions for their networks. However, one thing in common is that they want to address different GGSNs or gateways (GW) depending on requested access point name (APN) for different subscribers, for instance in accordance with their charging characteristics, Quality of Service (QoS, QCI) class, depending on their geographical position, International Mobile Subscriber Identity (IMSI) number or Mobile Subscriber ISDN Number (MSISDN).

During setup of resources for an application/user equipment an Access Point Name (APN) is used to identify a bearer service in a wireless network. The APN is then used in a Domain Name Server (DNS) query. This process, called APN resolution, gives the IP address of the GGSN or FQDN for the P-GW which should serve the access point for this application. The existing solutions for selecting GGSN comprises using the Public Land Mobile Network (PLMN) derived from the Mobile Subscriber ISDN Number MSISDN or by using charging characteristics received from the Home Location Register (HLR), and include it as infix in the APN used towards the DNS. Each selection criterion requires a specific infix in the APN and it is not possible to combine two or more criteria. Nor does the current solution take the geographical position of the user into account which is crucial for direct tunnel solutions and required by 3GPP for selection of S-GW.

In order solve these problems using the existing technologies extensive configuration of DNS is required.

SUMMARY

It is therefore an object of the present invention to provide a solution that may enable an operator to combine different selection criteria into one APN infix without extensive configuration of the DNS.

This is provided in a number of aspects of the present invention, in which a first is a method for resolving a gateway in a wireless network. The method comprises the steps of:
obtaining in a mobility node a request for bearer activation;
determining an access point name, APN, with an infix selected from a list of combinations of selection criteria;
sending the APN with the infix to a domain name server, DNS;
receiving a gateway identification from the DNS;
The infix comprises at least an indication of a geographical area.

Each entry in the list of combinations with possible infixes comprises an identification relating to a unique combination of selection criteria. The infix may comprise at least one of network identification, traffic class, and charging information.

A second aspect of the present invention is provided; a node in a wireless communication network. The node comprising:
a processor;
a memory;
a communication interface;
The processor may be arranged to execute program code stored in the memory, for relating a communication session of user equipment to a network gateway. The program code executes instruction sets for:
obtaining on the communication interface a request for bearer activation;
determining an access point name, APN, with an infix selected from a table;
sending on the communication interface the APN to a domain name server, DNS; and
receiving on the communication interface a gateway identification from the DNS.
The infix comprises at least an indication of a geographical area.

A third aspect of the present invention is provided; a computer program stored in a computer readable storage media. The computer program comprises instruction sets for:
obtaining in a mobility node a request for bearer activation;
determining an access point name, APN, with an infix selected from a table;
sending the APN to a domain name server, DNS; and
receiving a gateway identification from the DNS.
The infix comprises at least an indication of a geographical area.

With this solution a suitable gateway may be selected reducing the transport length of user plane data thus better utilizing network infrastructure resources. Furthermore, it is possible to provide operators with flexibility to configure APN resolution for specific real time requirements without the need for an extensive configuration in the DNS.

These and other aspects and advantages of the invention will be apparent from and elucidated with reference to the embodiments described hereinafter.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION OF PREFERRED EMBODIMENTS

Figure 1:
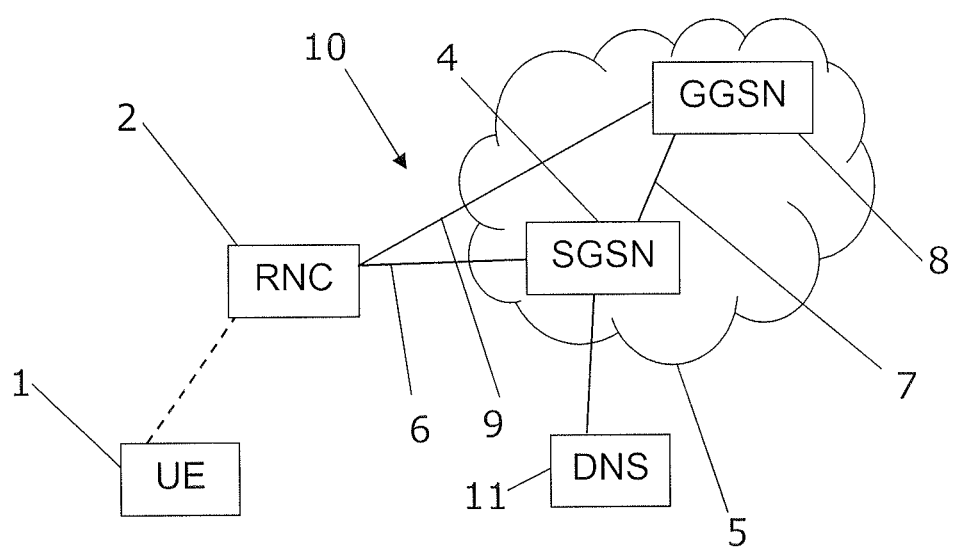
FIG. 1 illustrates schematically a network according to the present invention.

In FIG. 1 reference numeral 10 generally depict a network according to the present invention. The network comprises a core infrastructure network 5 with a mobility device 4, e.g. an SGSN or MME, and a gateway 8, e.g. a GGSN or an S-GW, communicating with each other using a suitable interface 7. The SGSN is configured to communicate with a domain name server (DNS) 11 using an interface. User equipment (UE) 1 attaches to the network via a radio access device 2, e.g. a RNC, an eNodeB, or a Base Station, in turn connected to the core network 5 via suitable interfaces 6 and/or 9.

The UE communicates with the radio access device using any suitable radio protocol and communication protocol depending on radio access setup. The radio protocol is arranged so as to allow for packet based communication, e.g. using the Internet Protocol (IP) of any suitable version, e.g. version 4 or 6.

Figure 2:
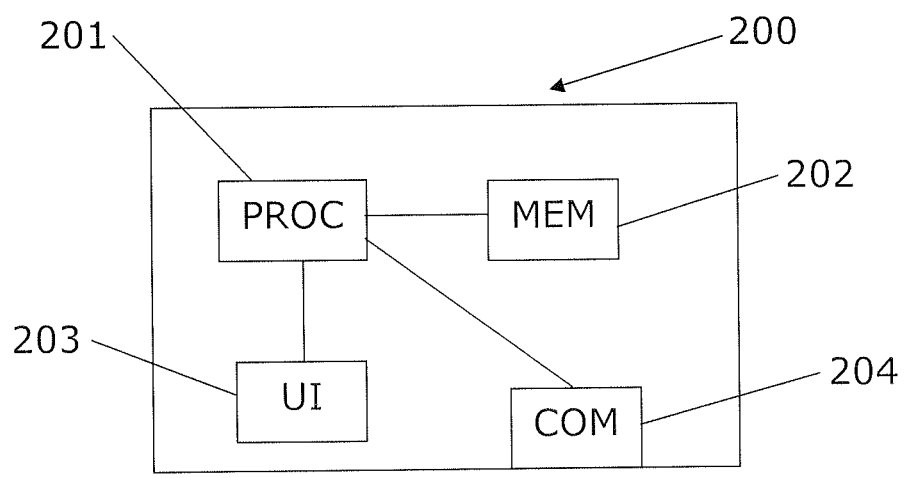
FIG. 2 illustrates schematically a device according to the present invention.

FIG. 2 illustrates a device 200 implementing the present invention. The device is part of the core infrastructure network. The device comprises a processing unit 201 arranged to execute software or hardware instruction sets for operating method/functional steps according to the present invention. The instruction sets are stored in a computer readable storage medium 202 connected to the processing unit. Furthermore, the processing unit is arranged to communicate externally with other devices connected to the network, using a communication interface 204. The device may optionally comprise a user interface module 203. The processor may comprise a micro processor, a Field Programmable Gate Array (FPGA), Application Specific Integrated Circuit (ASIC), or similar device. Furthermore, the storage device may be any suitable type, such as volatile or non-volatile memory, e.g. RAM, ROM, hard drive, EPROM, Flash, and so on. The communication interface may comprise any suitable packet based communication type, e.g. Ethernet or similar.

In the present invention, a configuration tool is provided for operators of an infrastructure network for configuring Access Point Name (APN) with information relating to different selection criteria relating to the UE. This configuration tool allows for geographical optimization of selection of suitable gateway together with other selection criteria. Operators may setup selection criteria in accordance with needs and configurations specific for their network and communicate these selection criteria to a database table distributed to one or several infrastructure nodes in the network. Software for this may be provided in a network management and/or network control solution.

The UE may be related to a certain geographical area (GA) comprising one or several routing areas (RA) and/or one or several tracking areas (TA). In one embodiment, an RA or TA belongs to only one GA at a time and in another embodiment they may belong to several GA. A list of TAs, TAI list may also be represented as a GA.

Upon setup of a new bearer or context, a gateway is to be selected. This selection may be based on one or several selection criteria communicated to a selection entity, e.g. a domain name server (DNS).

In order to provide several selection criteria in the APN message a table is created and stored in suitable network entities. The table provides a lookup table of certain combinations of criteria used for selection of gateway and each combination is assigned a unique infix identifier: a Service Category Index (SCI). This identifier is used in the APN in a query towards the DNS. These criteria comprise a rule applied at PDP Context/EPS Bearer initiation. Using these criteria it is possible to direct UEs in a certain geographical area to one or several pre-defined gateways, e.g. GGSN or GW.

The SCI may comprise for instance a combination of the geographical area, Public Land Mobile Network (PLMN) ID in International Mobile Subscriber Identity (IMSI), traffic class, charging characteristics, and other criteria that may be of interest for selection of gateway. Such a combination of selection criteria may not overlap, i.e. each combination is unique. Other criteria may for instance comprise whole IMSI, MSISDN, part of MSISDN or IMSI, background, interactive, streaming, conversational, routing area identity, home or visiting subscriber, and so on. These criteria comprise a rule applied at PDP context/EPS Bearer set-up.

Figure 3:
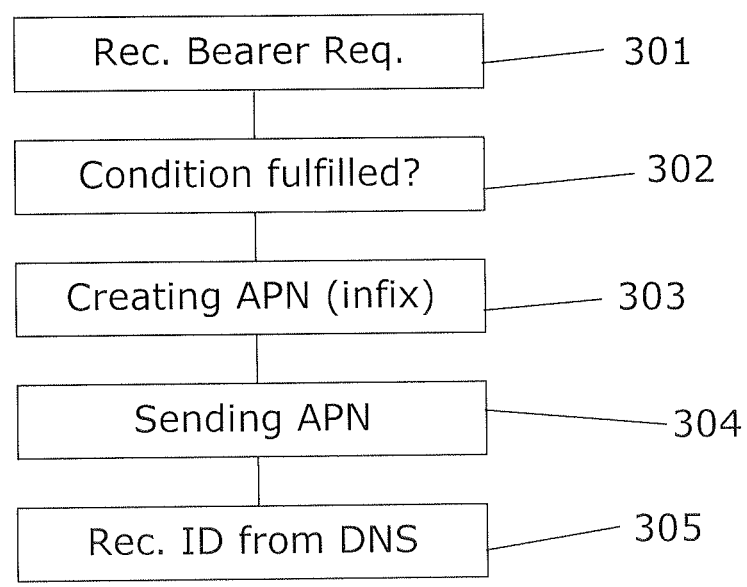
FIG. 3 illustrates schematically a method according to the present invention.

In FIG. 3, a method during bearer establishment for an UE according to the present invention is schematically illustrated with the steps of:

301. Receiving a request for bearer establishment in a mobility handling node. This request may come from the UE via the radio access node. The bearer is related to an application in the UE, e.g. a web browser, email session, streaming media session, and so on.

302. Optionally, checking if certain conditions are fulfilled, e.g. if the UE is located in Home Public Land Mobile Network (HPLMN), if the subscriber identity is defined as an APN resolution criteria.

303. Creating an APN with an infix chosen from a table. The mobility node selects a suitable selection criteria combination from a list of available criteria combinations in a table depending on UE status and configuration.

304. Sending the APN to a DNS. The mobility node sends the APN as a request to the DNS in order to determine a gateway to which the UE is to be connected.

305. Receiving from the DNS a gateway identification (ID), e.g. an IP address, for use in setting up the bearer/context. The network is then configured so the data for this bearer/context is related to this gateway.

These steps may be performed in a mobility node such as the SGSN or MME depending on the network configuration.

Figure 4:
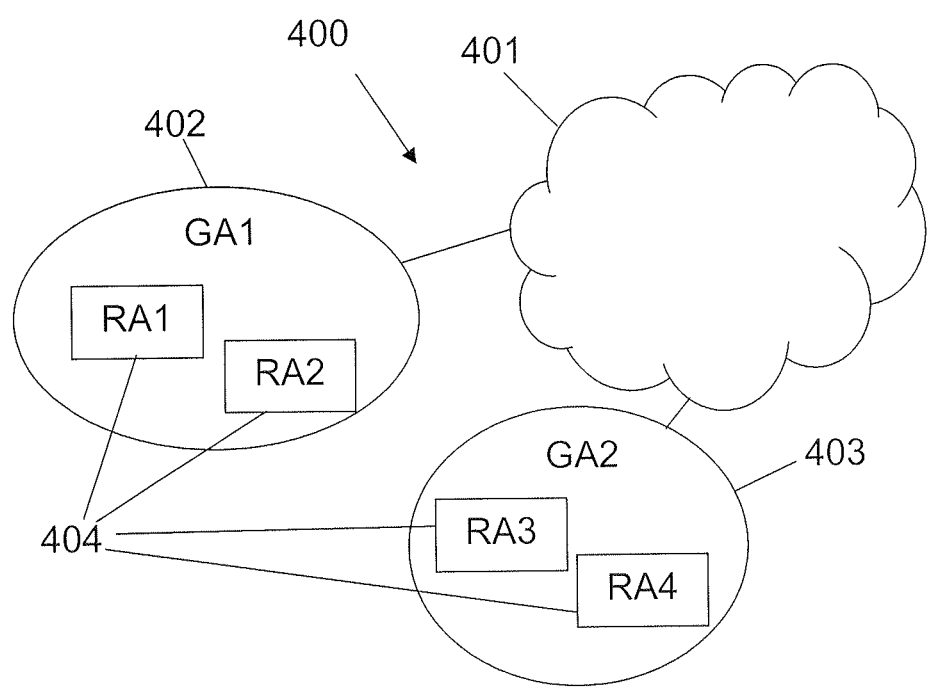
FIG. 4 illustrates schematically a network configuration according to the present invention.

The concept of geographical areas is illustrated in more detail in FIG. 4 which shows a network 400 according to the present invention. In this example, two different geographical areas GA1 402 and GA2 403 both comprise each two routing areas RA1, RA2 and RA3, RA4 404. The geographical areas are related to the infrastructure network 401. As seen in FIG. 4, the routing areas do not overlap, i.e. they do not belong to more than one geographical area.

The DNS selects an appropriate gateway using the selection criteria related to the infix of the APN request. The selection may be based on the geographical area indicated and/or other criteria related to the UE but also optionally network configuration and status criteria, such as for load balancing between gateways or for decreasing the risk of having to change gateway to often during a session.

In E-UTRAN the present invention may be used when looking up the S-GW. The Serving GW selection function selects an available Serving GW to serve a UE. The selection bases on network topology, i.e. the selected Serving GW serves the UE's location and in case of overlapping Serving GW service areas, the selection may prefer Serving GWs with service areas that reduce the probability of changing the Serving GW. Other criteria for Serving GW selection should include load balancing between Serving GWs.

Optionally, if a subscriber of a GPRS Tunneling Protocol (GTP) only network roams into a Proxy Mobile IP (PMIP) based network, the Packet Data Network (PDN) GWs selected for local breakout support the PMIP protocol, while PDN GWs for home routed traffic use GTP. This means the Serving GW selected for such subscribers may need to support both GTP and PMIP, so that it is possible to set up both local breakout and home routed sessions for these subscribers. For a Serving GW supporting both GTP and PMIP, the MME/SGSN may indicate for the Serving GW which protocol that is to be used over S-GW and PDN GW interface (S5/S8). The MME/SGSN is configured with the S8 variant(s) on a per HPLMN granularity.

Further optionally, if a subscriber of a GTP only network roams into a PMIP network, the PDN GWs selected for local breakout may support GTP or the subscriber may not be allowed to use PDN GWs of the visited network. In both cases a GTP only based Serving GW may be selected. These cases are considered as roaming between GTP based operators. If combined Serving and PDN GWs are configured in the network the Serving GW Selection Function preferably derives a Serving GW that is also a PDN GW for the UE. The Domain Name Service function may be used to resolve a DNS string into a list of possible Serving GW addresses which serve the UE's location.

In order to facilitate the decision for which APNs a certain rule is applicable an APN Class may be created. An APN Class is an aggregation of one or more APNs.

With the solution according to the present invention, it will e.g. be possible to direct UEs in a certain geographical area using traffic class "Streaming" and with a particular PLMN-ID in their IMSI, towards one or several pre-defined GGSNs/GWs.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

ABBREVIATIONS

3GDT 3G Direct Tunnel
CN Core Network
E-RAB Evolved Radio Access Bearer
E-UTRAN Evolved UMTS Terrestrial Radio Access Network
GGSN Gateway GPRS Support Node
GUTI Globally Unique Temporary UE Identity
HLR Home Location Register
HSS Home Subscriber Server
LTE Long Term Evolution
MME Mobility Management Entity
MS Mobile Station
MSISDN Mobile Subscriber ISDN Number
NAS Non-Access Stratum
P-TMSI Packet-Temporary Mobile Subscriber Identity
RAB Radio Access Bearer
RAN Radio Access Node
RAU Routing Area Update
RNC Radio Network Controller
SAE System Architecture Evolution
SGSN Serving GPRS Support Node
SGW Serving Gateway
SRNS Serving Radio Network Subsystem
TAU Tracking Area Update
UE User equipment
UTRAN UMTS Terrestrial Radio Access Network
WCDMA Wideband Code Division Multiple Access

The invention claimed is:

1. A method performed by a mobility node for resolving a gateway in a wireless communication network, the method comprising:
   obtaining a request for bearer activation;
   determining, based on the request for bearer activation, an access point name (APN) with an infix selected from a list of combinations of selection criteria;
   sending the APN with the infix to a domain name server (DNS), the APN representing a request to determine a gateway to which a user equipment (UE) is to be connected, the infix comprising at least an indication of a geographical area, and the geographical area comprising at least one routing area or at least one tracking area; and
   receiving a gateway identification of the gateway from the DNS.

2. The method according to claim 1, wherein the infix comprises at least one other identification relating to a unique combination of selection criteria.

3. The method according to claim 1, wherein the infix further comprises at least one of network identification, traffic class, and charging information.

4. The method according to claim 1, further comprising communicating the gateway identification to nodes in the wireless communication network.

5. The method according to claim 1, wherein the mobility node is a Serving GPRS Support node (SGSN) or a Mobility Management Entity node (MME).

6. The method according to claim 1, wherein the infix comprises a Service category Index (SCI).

7. The method according to claim 1, wherein the geographical area comprises at least one routing area and at least one tracking area.

8. The method according to claim 1, wherein the at least one routing area or the at least one tracking area belong at most to the geographical area.

9. The method according to claim 1, further comprising aggregating one or more APNs with similar selection rules into an APN class.

10. A non-transient computer-readable medium encoded with a computer program for relating a communication session of a user equipment to a network gateway, the computer program comprising instructions, that when executed by a processor are configured to:
    obtain a request for bearer activation;
    determine, based on the request for bearer activation, an access point name (APN) with an infix selected from a table;
    send the APN to a domain name server (DNS), the APN representing a request to determine a gateway to which a user equipment (UE) is to be connected, the infix comprising at least an indication of a geographical area, and the geographical area comprising at least one routing area or at least one tracking area; and
    receive a gateway identification of the gateway from the DNS.

11. The computer-readable medium of claim 10, wherein the computer program is stored in a Serving GPRS Support node (SGSN) or a Mobility Management Entity node (MME).

12. The computer-readable medium of claim 10, wherein the infix comprises at least one other identification relating to a unique combination of selection criteria.

13. A node in a wireless communication network, the node comprising:
- a communication interface configured to obtain a request for bearer activation; and
- a processor configured to determine, based on the request for bearer activation, an access point name (APN) with an infix selected from a table,
- wherein the communication interface further configured to
  - send the APN to a domain name server (DNS), the APN representing a request to determine a gateway to which a user equipment (UE) is to be connected, the infix comprising at least an indication of a geographical area, and the geographical area comprising at least one routing area or at least one tracking area, and
  - receive a gateway identification of the gateway from the DNS.

14. The node of claim 13, wherein the node is a Serving GPRS Support node (SGSN) or a Mobility Management Entity node (MME).

15. The node of claim 13, wherein the infix comprises at least one other identification relating to a unique combination of selection criteria.

16. The node of claim 13, wherein the infix further comprises at least one of a network identification, traffic class, and charging information.

17. The node of claim 13, wherein the communication interface is further configured to communicate the gateway identification to nodes in the wireless communication network.

18. The node of claim 13, wherein the infix comprises a Service category Index (SCI).

19. The node of claim 13, wherein the geographical area comprises at least one routing area and at least one tracking area.

20. The node of claim 13, wherein the at least one routing area or the at least one tracking area belong at most to the geographical area.

21. The node of claim 13, wherein one or more APNs with similar selection rules are aggregated into an APN class.

* * * * *